(12) United States Patent
Sakakibara

(10) Patent No.: US 7,078,836 B2
(45) Date of Patent: Jul. 18, 2006

(54) ALTERNATOR FOR A VEHICLE

(75) Inventor: Hiroshi Sakakibara, Chita-gun (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 10/936,801

(22) Filed: Sep. 9, 2004

(65) Prior Publication Data
US 2005/0062349 A1 Mar. 24, 2005

(30) Foreign Application Priority Data
Sep. 22, 2003 (JP) .............................. 2003-330119

(51) Int. Cl.
H02K 5/00 (2006.01)

(52) U.S. Cl. .......................................... 310/89; 310/91

(58) Field of Classification Search ................... 310/89, 310/91, 42; 29/596–598
See application file for complete search history.

(56) References Cited

U.S. PATENT DOCUMENTS

| 489,665 | A | * | 1/1893 | Williams ...................... 276/44 |
| 4,096,624 | A | * | 6/1978 | Gray et al. .................... 29/596 |
| 4,666,122 | A | * | 5/1987 | Goodard ..................... 248/666 |
| 4,849,665 | A | * | 7/1989 | Kitamura et al. .......... 310/68 D |
| 4,945,272 | A | * | 7/1990 | Ochi et al. ..................... 310/91 |
| 4,980,589 | A | * | 12/1990 | Ochi et al. ................. 310/68 D |
| 5,696,415 | A | * | 12/1997 | Fujimoto et al. ............. 310/89 |
| 5,705,870 | A | * | 1/1998 | Thomsen et al. ............. 310/91 |
| 5,760,513 | A | * | 6/1998 | Morishita et al. ............. 310/91 |
| 5,914,549 | A | * | 6/1999 | Adachi et al. ................. 310/89 |
| 5,914,551 | A | * | 6/1999 | Kern et al. .................... 310/91 |
| 6,147,426 | A | * | 11/2000 | Lepi et al. ..................... 310/91 |
| 6,304,016 | B1 | * | 10/2001 | Frederick et al. ............. 310/91 |
| 6,504,280 | B1 | * | 1/2003 | Trowbridge ................... 310/91 |
| 2002/0117920 | A1 | * | 8/2002 | Trowbridge ................... 310/89 |
| 2004/0164630 | A1 | * | 8/2004 | Gautier ......................... 310/89 |
| 2004/0189121 | A1 | * | 9/2004 | Kawano ......................... 310/89 |

FOREIGN PATENT DOCUMENTS

| JP | 07327336 | * | 12/1995 |
| JP | 11262213 | * | 9/1999 |
| JP | A-11--262213 | | 9/1999 |
| JP | 2001251799 | * | 8/2001 |
| JP | 2002058193 | * | 2/2002 |
| WO | WO-86/02788 | * | 9/1986 |

* cited by examiner

Primary Examiner—Darren Schuberg
Assistant Examiner—Heba Elkassabgi
(74) Attorney, Agent, or Firm—Oliff & Berridge, PLC

(57) ABSTRACT

In a side-mount type vehicle alternator, the mounting faces of a larger stay and a smaller stay are arranged such that the fictive line, which runs through the center of a mounting hole on the mounting face of the larger stay and the center of the mounting hole on the mounting face of the smaller stay, is on the outside of an outermost surface of a front frame and a rear frame. Thus, the alternator is lifted up from an engine bracket and it is possible to make a large space. Hot air being exhausted from exhaust windows flows smoothly to the outside of the space.

18 Claims, 4 Drawing Sheets

ALTERNATOR FOR A VEHICLE

CROSS REFERENCE TO RELATED APPLICATION

This application is based on and incorporates herein by reference Japanese Patent Application No. 2003-330119 filed on Sep. 22, 2003.

Field of the Invention

This invention relates to an alternator for a vehicle, especially to a structure of an alternator to be mounted on an engine of a vehicle.

BACKGROUND OF THE INVENTION

JP-A-H 11-262213 and JP-B 3235444 (U.S. Pat. No. 5,914,549) disclose structures of side-mount type alternators that are mounted on engines of vehicles.

In JP-A-H 11-262213, as shown in FIG. 7, an alternator 100 has three stays 120 that are integrally formed with a frame 110. The alternator 100 is fastened on an engine bracket 200 with bolts 130 penetrating mounting holes 121 that are provided in the stays 120, as shown in FIG. 8.

Each of the stays 120 is formed so that a penetrating axis of the mounting hole 121 (i.e. the axis of the bolt 130 penetrating the mounting hole 121) is orthogonal to an axis of a rotating shaft, not shown in the figures, of the alternator 100. Therefore, the alternator 100 is mounted on the engine bracket 200 so that the axis to which the alternator 100 is fastened to is orthogonal to the axis of the rotating shaft of the alternator 100. This type of alternator is known as a side-mount type.

Generally, a plurality of intake windows 140 and a plurality of exhaust windows 150 are formed on the frame 110 to provide air cooling of high temperature components such as a rotor, a stator, an IC regulator and a rectifier (diodes).

In the side-mount type structure, as disclosed in JP-A-H 11-262213 and as shown in FIG. 8, with respect to the penetrating direction of the mounting holes 121 (horizontal direction of FIG. 8), the outermost surface of the frame 110 protrudes to the engine side beyond a mounting face 122. Therefore, a space 300 between the frame 110 and the engine bracket 200 is very narrow. As a result, the ventilation is poor.

Under the above circumstances, at the engine side of the alternator 100, hot air after cooling the inside of the frame 100 and being exhausted from the exhaust windows 150 does not flow smoothly and tends to stay at the space 300. The hot air at the space 300 is reintroduced from the intake windows 140 into the inside of the frame 110. As a result, it is insufficient to cool the inside of the frame 110 and the lifetime of the high temperature components of the alternator 100 that need to be cooled is severely shortened. Furthermore, the power output of the alternator 100 falls because of insufficient cooling of the rotor and the stator accommodated in the frame 110.

SUMMARY OF THE INVENTION

It is therefore an object of this invention to improve cooling of a side-mount type vehicle alternator.

In order to attain the above object, an alternator that embodies the invention is designed as follows. A mounting hole to be penetrated by a fastening member is provided on a stay that is integrally formed with a frame of an alternator. The mounting hole is a through-hole of the stay and the penetrating axis of the mounting hole is orthogonal to the axis of rotation of a rotating shaft. Regarding at least one of multiple stays, a mounting face, which contacts a stay of an engine, is on the outside (i.e. on an engine side) from the outermost surface of the frame with respect to the mounting direction to the engine. Namely, the mounting face of the stay is closer to the engine than the outermost surface of the frame with respect to the mounting direction to the engine.

Thus, the space between the frame and the engine is enlarged. Thus, hot air exhausted from the exhaust windows of the frame tends not to stay at the space and consequently hot air flows smoothly to the outside of the space. As a result, the hot air exhausted from exhaust windows is not reintroduced into the inside of the frame. Thus it is possible to improve the cooling of the alternator and to prevent a rise in temperature of the inside of the alternator from occurring.

It is preferable that a plurality of stays is comprised of a first stay and a second stay. With respect to the mounting direction in which the alternator is mounted on the engine, the level of a mounting face of the first stay is different from the level of a mounting face of the second stay (i.e. the mounting face of the first stay is out of alignment of a mounting face of the second stay). A fictive line running through the center of a mounting hole on the mounting face of the first stay and the center of a mounting hole on the mounting face of the second stay is on the outside of an outermost surface of the frame. Namely, the fictive line is neither contacted nor crossed by the surface of the outermost frame facing the engine side, i.e. the outermost surface of the frame facing the engine side is not extending beyond the above fictive line.

According to this structure, the outermost surface of the frame is on the opposite side of the engine with respect to the fictive line. Therefore, it is possible to make enough space between the frame and the engine that enables hot air being exhausted from the exhaust windows of the frame to flow smoothly to the outside of the space.

A structure may be provided in which levels of mounting faces of the stays are the same with respect to the mounting direction in which the alternator is mounted on the engine (i.e. a mounting face of one stay is aligned in the same direction than a mounting face of any other stay).

According to this structure, with respect to the mounting direction in which the alternator is mounted on the engine, mounting faces of all stays are on the outside of the outermost surface of the frame. Namely, with respect to the mounting direction in which the alternator is mounted on the engine, the outermost surface of the frame is on the opposite side of the engine when viewed from a fictive plane which is comprised of the mounting faces of the stay of the engine. Therefore, it is possible to make enough space between the frame and the engine.

It is preferable that a plurality of stays has at least three mounting holes in total. By connecting the centers of such mounting holes, a fictive polygon is made. When the center of a rotor accommodated in the frame is projected onto a fictive plane spanned by the fictive polygon with respect to the mounting direction, the projected center of the rotor is on the inside of the fictive polygon.

According to this structure, it is possible to fix the alternator to the engine in a balanced manner providing a stable mounting position. As a result, it is possible to prevent abnormal vibration such as resonance, thus quality and ruggedness of the alternator are improved.

It is preferable that a plurality of stays comprises a larger stay and a smaller stay. A mounting face of the larger stay has larger contact area than the smaller stay that contacts the stay of the engine. The first stay has two mounting holes and the second stay has one mounting hole.

According to this structure, it is possible to firmly fix the alternator to the engine by using three mounting holes. Furthermore, according to this structure, two mounting holes are provided on one stay (on the first stay). Therefore, the mounting face of such mounting holes does not need to adjust the alignment. As a result, this structure is easy to manufacture when compared to a structure which has three mounting holes on three separate stays.

It is preferable that the stays are integrally formed with a front frame of an alternator.

In case that stays are formed integrally with a front frame and with a rear frame of an alternator, circumferential positions of the front frame and the rear frame need to be precisely adjusted so that mounting faces of the stays on the front frame and mounting faces of the stays on the rear frame are positioned the same plane. If such circumferential positions are not adjusted precisely, stress is added to at least one of the stays when an alternator is fixed to the engine. Such stress induces a damaging effect to the front frame or the rear frame.

All stays are integrally formed with a front frame. Thus, the mounting faces of all stays can be positioned in the same plane without adjusting the circumferential positions of the front frame and the rear frame. As a result, assembling of the front frame and the rear frame is easy. A combination of a front frame and a rear frame is more flexible. Therefore, it is possible to unify the shape of a rear frame such that it can be used with alternators of other types. Furthermore, no stress is added to the stays when an alternator is fixed to the engine. Therefore, it is possible to fix the alternator to the engine in a balanced manner.

There may be provided a structure in which the stays are integrally formed with a rear frame of an alternator.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

The preferred embodiments of the present invention will be explained with reference to various embodiments in the accompanying drawings.

FIRST EMBODIMENT

Figure 1:
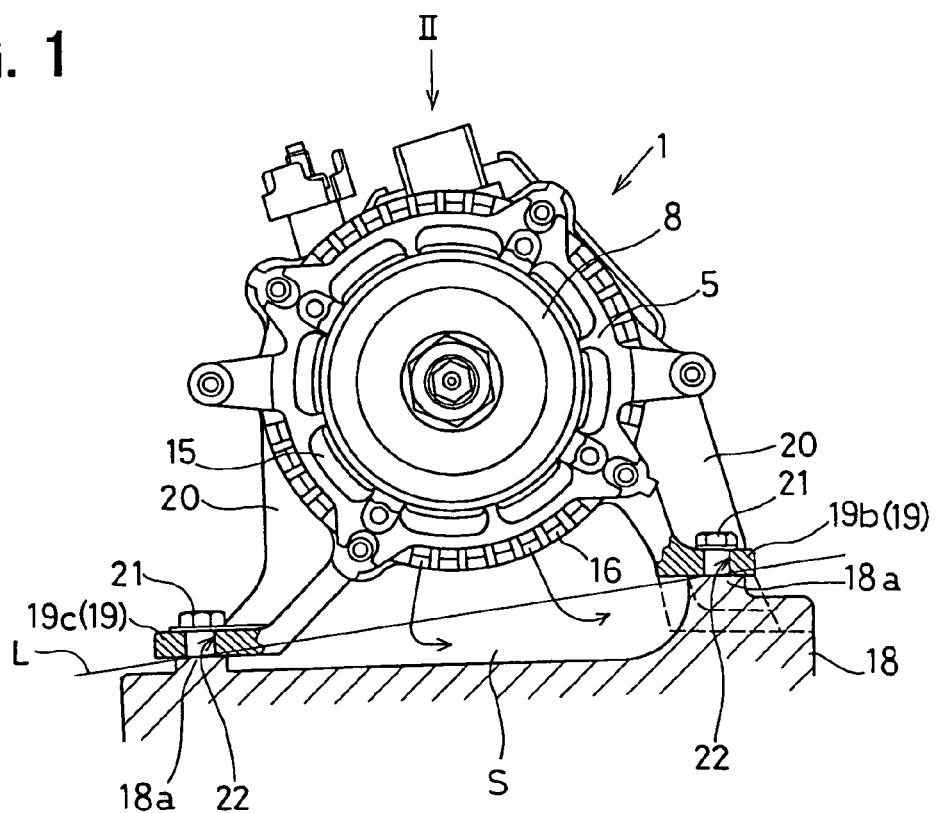
FIG. 1 is a front view of a vehicle alternator showing a first embodiment in accordance with the present invention.
Figure 2:
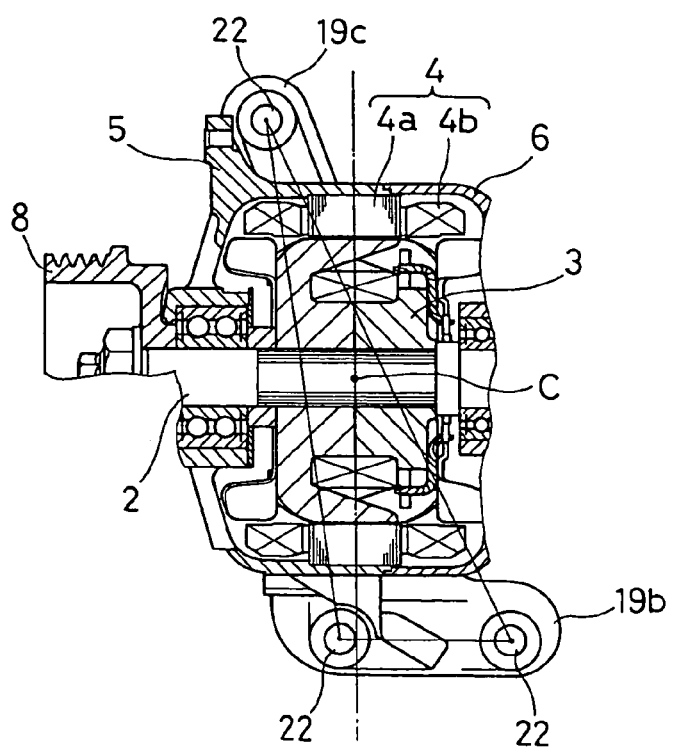
FIG. 2 is a partial cross sectional view of the alternator shown in FIG. 1 viewed from point II designated in FIG. 1.
Figure 3:
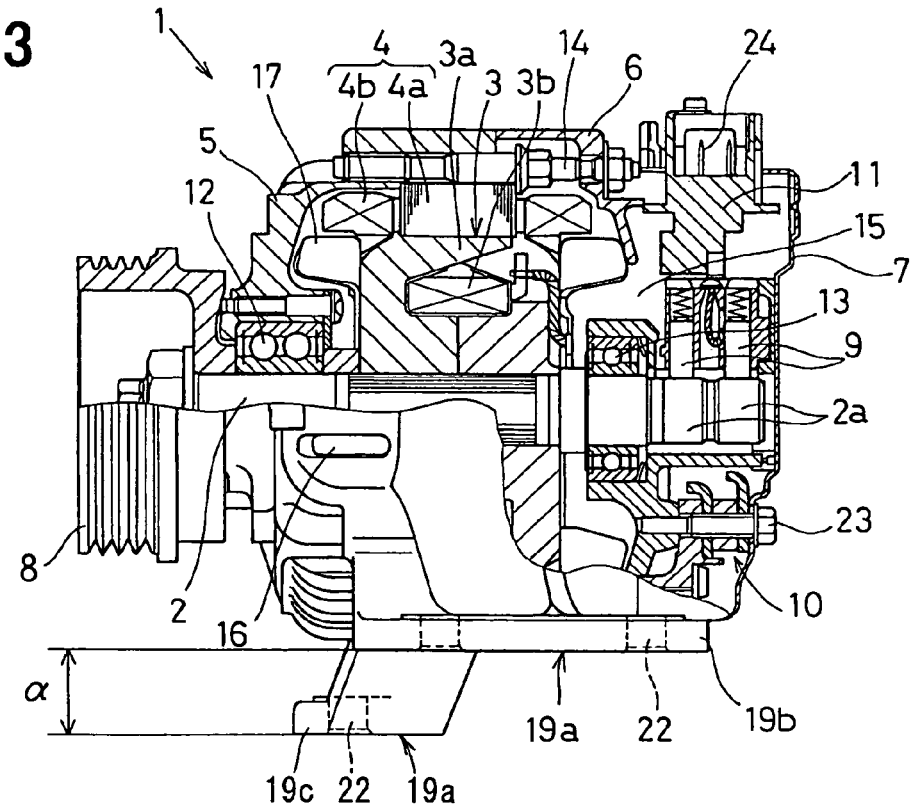
FIG. 3 is a cross sectional view of the alternator shown in FIG. 1.

FIGS. 1, 2 and 3 show a first embodiment of an alternator 1 for use in a vehicle. As shown in FIG. 3, the alternator 1 comprises a rotor 3 which rotates with a rotating shaft 2, a stator 4 which is disposed on the radial outside of the rotor 3, a front frame 5 and a rear frame 6 that accommodate the rotor 3 and stator 4, external components (specified below) which are disposed on the outside of the rear frame 6, and a protective cover 7 which covers the external components.

One end of the rotating shaft 2 protrudes from the front frame 5. A pulley 8 is fixed to one end of the rotating shaft 2. The rotating shaft 2 rotates when the engine (not shown in the figures) causes the pulley 8 to rotate.

The rotor 3 comprises a pole core 3a which is fixed to the rotating shaft 2 and a field coil 3b which is rolled up by the pole core 3a. The field coil 3b generates magnetic field when electric current for excitation is provided to the field coil 3b.

The stator 4 comprises a stator core 4a, which is supported by the front frame 5 and the rear frame 6, and stator coils 4b that are wound around the stator core 4a. In the stator coils 4b, an a/c voltage is induced due to a rotating magnetic field generated by rotation of the rotor 3.

The external components comprise electric components such as brushes 9, a rectifier 10 and a regulator 11. The brushes 9 contact slip rings 2a to supply an exciting current to the field coil 3b. The slip rings 2a are provided at another end of the rotating shaft 2 protruding from the rear frame 6 and rotate slidingly. The rectifier 10 rectifies the a/c voltage outputted from the stator 4 to a d/c voltage. The regulator 11 regulates the rectified d/c voltage in a desirable range.

The protective cover 7 covering the external components has a plurality of openings for ventilation.

The front frame 5 and the rear frame 6 support the rotating shaft 2 through bearings 12 and 13. The front frame 5 and the rear frame 6 are fastened to each other by a plurality of stud bolts 14 in the manner that openings of the front frame 5 and the rear frame 6 are fitted to each other along the axis of the alternator 1.

The front frame 5 and the rear frame 6 are made of, for example, aluminum by using die-casting. Each of the front frame 5 and the rear frame 6 has a plurality of intake windows 15 on its axial end walls and a plurality of exhaust windows 16 on its shoulder portion of the wall curving from axial end wall to radial end wall.

On the inside of the front frame 5 and the rear frame 6, cooling fans 17 are attached to the both axial ends of the pole core 3a as shown in FIG. 3. When the cooling fans 17 rotate with the rotation of the rotor 3, the inside of the front frame 5 and the rear frame 6 are ventilated through the intake windows 15 and the exhaust windows 16. Thus, high temperature components, such as the field coil 3b and the stator coil 4b, are cooled.

When the cooling fans 17 rotate, the air outside the alternator 1 is introduced through openings provided on the protective cover 7. The air introduced from the openings cools the external components.

As shown in FIG. 1, the front frame 5, stays 19 to fix the alternator 1 to an engine bracket 18, and stiffening ribs 20 are integrally formed.

The two stays 19, as shown in FIG. 1, are formed on both sides (both sides of radial direction which is orthogonal to the mounting direction to the engine) of the front frame 5. The stays 19 have mounting holes 22. Bolts 21 are screwed into holes (not shown in the figures) provided on mounting faces of the engine bracket through the mounting holes 22 so that the alternator 1 is fixed to the engine bracket 18.

As shown in FIG. 1, the alternator 1 is mounted to the engine bracket 18 such that the mounting direction is orthogonal to the axis of the rotating shaft 2 of the rotor 3. Therefore, the alternator 1 is a side-mount type alternator. Namely, the mounting holes 22 to be penetrated by the bolts 21 are provided such that the mounting holes 22 penetrate through the stays 19 in the direction orthogonal to the axis of the rotating shaft 2.

One of the two stays 19 has the larger area which contacts a mounting face 18a of the engine bracket 18 on its mounting face 19a (hereinafter called "larger stay 19b") than the mounting face 19a of the other stay 19 (hereinafter called "smaller stay 19c"). As shown in FIG. 2, the larger stay 19b has two mounting holes and the smaller stay 19c has one mounting holes. The mounting faces 19a of the stays 19 have an even flatness due to a cutting process performed after their die-casting process.

As shown in FIG. 1, the height of the mounting face 19a of the larger stay 19b is different from the height of the mounting face 19a of the smaller stay 19c with respect to the mounting direction. The mounting face 19a of the larger stay 19b is higher than the mounting face 19a of the smaller stay 19c. Namely, the mounting face 18a of the engine bracket 18 for the larger stay 19b is higher than the mounting face 18a of the engine bracket 18 for the smaller stay 19c.

When considering a fictive line L running through a center of a mounting hole 22 on the mounting face 19a of the larger stay 19b and a center of a mounting hole 22 on the mounting face 19a of the smaller stay 19c, the mounting faces 19a of the stays 19 are arranged such that the fictive line L is on the outside (i.e. the side of the engine bracket 18) of an outermost surface of the front frame 5 and the rear frame 6.

A fictive triangle can be made by connecting the centers of three mounting holes 22. As shown in FIG. 2, three mounting holes 22 are arranged such that when the center of the rotor 3 (which is approximately equal to the center of mass of the alternator 1) is projected onto a fictive plane which includes such a fictive triangle with respect to the mounting direction, a projected center C is on the inside of the fictive triangle.

As shown in FIG. 1, the stiffening ribs 20 extend from an approximate center of both sides of the front frame 5 (i.e. the outermost surface on the right side and the outermost surface on the left side of the front frame 5 in FIG. 1) to the position around the mounting holes 22 of the stays 19 (the larger stay 19b and the smaller stay 19c). Furthermore, the stiffening ribs 20 are formed to support the stays 19 to carry the alternator 1.

As described above, when considering the fictive line L running through the center of the mounting hole 22 on the mounting face 19a of the larger stay 19b and the center of the mounting hole 22 on the mounting face 19a of the smaller stay 19c, the height of mounting faces 19a of the larger stay 19b and the smaller stay 19c against the engine bracket 18 are arranged such that the fictive line L is on the outside of the outermost surface of the front frame 5 and the rear frame 6.

According to this structure, as shown in FIG. 1, the alternator 1 is lifted up from the engine bracket 18 by the larger stay 19b and the smaller stay 19c. As a result, it becomes possible to make larger space S between the engine bracket 18 and the frames (front frame 5 and rear frame 6) when compared to a conventional side-mount type alternator.

Therefore, as shown in FIG. 1, hot air exhausted from the exhaust windows 16, especially from the exhaust windows 16 on the engine bracket side, tends not to stay at the space S and such hot air flows smoothly to the outside of the space S. The hot air exhausted from exhaust windows 16 is then hardly reintroduced from the intake windows 15 to the inside of the alternator 1. Thus it is possible to improve the cooling of the alternator 1 and to prevent a rise in temperature on the inside of the alternator 1 from occurring. It is also possible to achieve a long lifetime of the high temperature components (such as a field coil 3b, stator coils 4b, brushes 9, a rectifier 10 and a regulator 11) and to maintain a high level of performance of the high temperature components.

As described above, three mounting holes 22 are arranged such that a projected center C of the rotor 3 is on the inside of the fictive triangle which is made by connecting the centers of three mounting holes 22. According to this structure, it is possible to fix the alternator 1 to the engine bracket 18 firmly and in a balanced manner. As a result, it is possible to prevent abnormal vibration such as resonance, thus improving quality and ruggedness of the alternator 1.

As described above, the front frame 5, the larger stay 19b and the smaller stay 19c are integrally formed. Namely, the rear frame 6 has no stay. Therefore, it is possible to unify the shape of the rear frame 6 such that it can be used with an alternator of other types. Furthermore, in case stud bolts 14 to fix the front frame 5 and the rear frame 6 are disposed, for example, every 90 degrees (the center is rotation axis), the rear frame 6 can be fixed to the front frame 5 even if the rear frame 6 is revolved multiple times by 90 degrees. Therefore, positions of components that are fixed to the rear frame 6 such as an output terminal bolt 23 and connector 4 shown in FIG. 3 are variable.

In this first embodiment, as shown in FIG. 3, there is a gap α between the larger stay 19b and the smaller stay 19c. However, there may be no gaps between them. Namely, the mounting face 19a of the larger stay 19b may be in the same plane as the mounting face 19a of the smaller stay 19c. In this case, the mounting faces 18a of the engine bracket for each stays are arranged in the same height.

In this first embodiment, both mounting faces 19a of the larger stay 19b and the smaller stay 19c are on the side of the engine bracket 18 from the outermost surface of the front frame 5 and the rear frame 6. However, either mounting faces 19a of the larger stay 19b and the smaller stay 19c may be on the opposite side of engine bracket 18 (on the upper side in FIG. 1) from the outermost surface of the front frame 5 and the rear frame 6. In this case, it is preferable to arrange the height of the mounting faces 19a of the larger stay 19b and the smaller stay 19c so that the fictive line L, which runs through the center of the mounting hole 22 on the mounting face 19a of the larger stay 19b and the center of the mounting hole 22 on the mounting face 19a of the smaller stay 19c, is in the outside of an outermost surface of the front frame 5 and the rear frame 6.

In the first embodiment, the stays 19 are the larger stay 19b and the smaller stay 19c. However, the stays 19 may be only larger stays 19b or may be only smaller stays 19c.

SECOND EMBODIMENT

Figure 4:
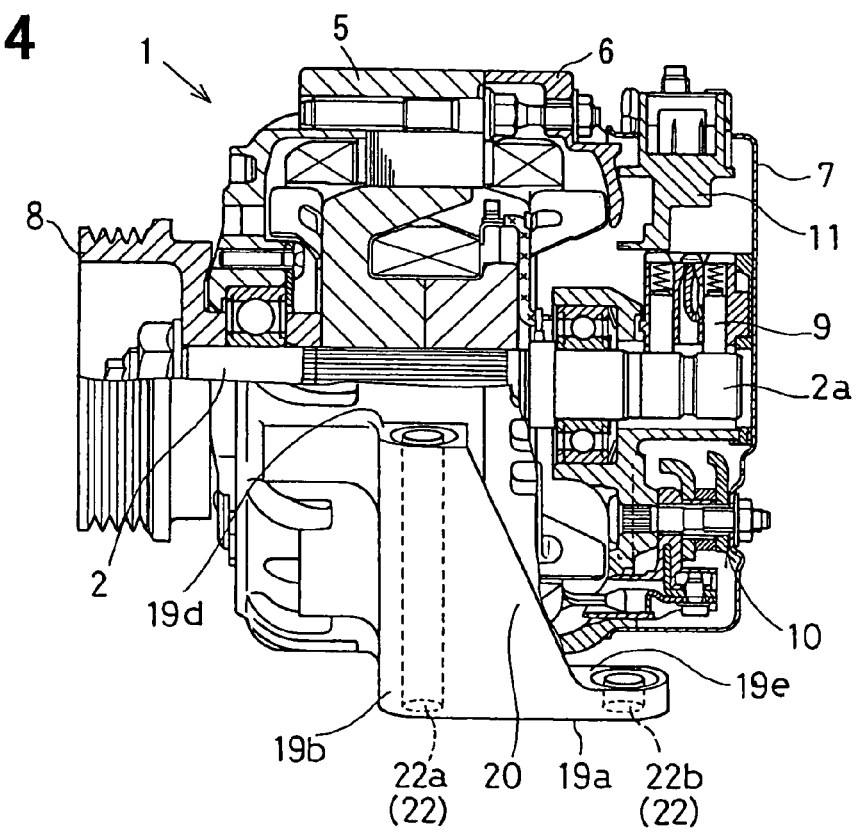
FIG. 4 is a cross sectional view of the vehicle alternator showing a second embodiment in accordance with the present invention.
Figure 5:
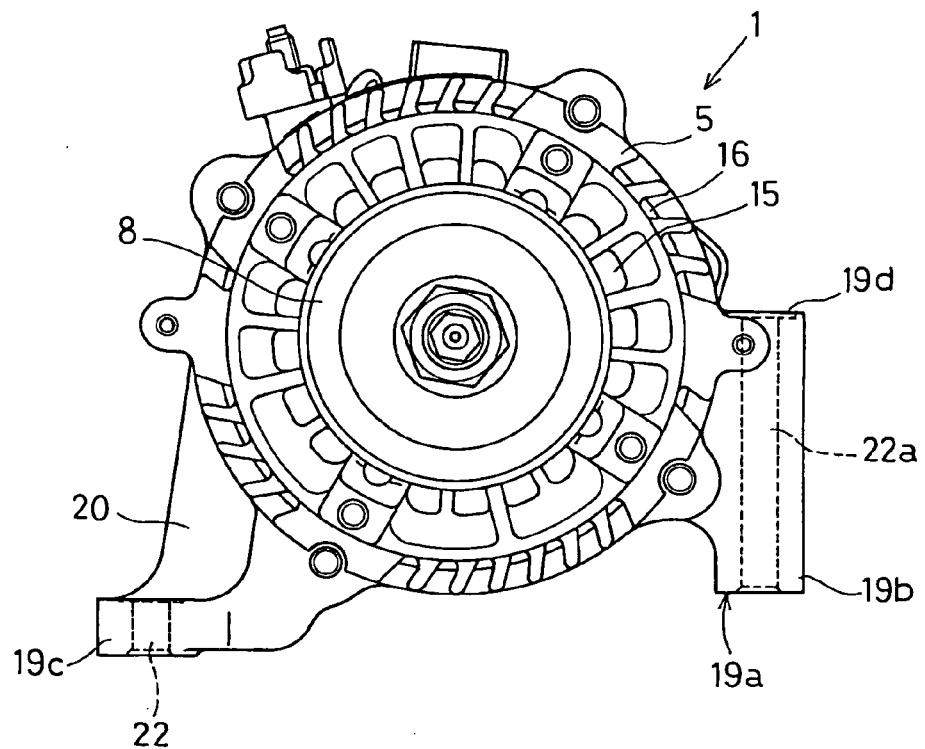
FIG. 5 is a front view of the alternator shown in FIG. 4.

As shown in FIG. 4, a mounting hole 22a, one of the two mounting holes provided on the larger stay 19b, has a longer depth than a mounting hole 22b, the other hole. Namely, regarding the end surface of the larger stay 19b which is opposed to the mounting face 19a, the mounting hole 22a has a different height than the mounting hole 22b. The end surface 19d on the side of the mounting hole 22a is arranged at a higher position than the end surface 19e on the side of the mounting hole 22b. As shown in FIG. 5, the end surface 19d is arranged at approximately the same height as the center of the front frame 5, i.e. at approximately the same height as the center of the rotating shaft 2 with respect to the mounting direction.

As shown in FIG. 4, the portion between the mounting faces 22a and 22b is arranged as stiffening rib 20 which is integrally formed with the larger stay 19b. The stiffening rib 20 is formed at a slant from the end surface 19d to the end surface 19e such that the whole width of the larger stay 19b gradually extends.

According to the above structure of the second embodiment, the strength of the larger stay 19b is improved from the first embodiment. Therefore, it is possible to fix the alternator 1 to the engine bracket 18 firmly with enough strength.

[Modification]

In the first and the second embodiments, the mounting faces 19a of the stays 19 may be on the same plane. That is, the stay 19b may be provided at the same height as the stay 19c by extending the rib 20 as shown schematically with a dotted line in FIG. 1. This structure will be effective even in case the mounting faces 18a of the engine bracket 18 are at the same height as shown by the dotted line.

Figure 6:
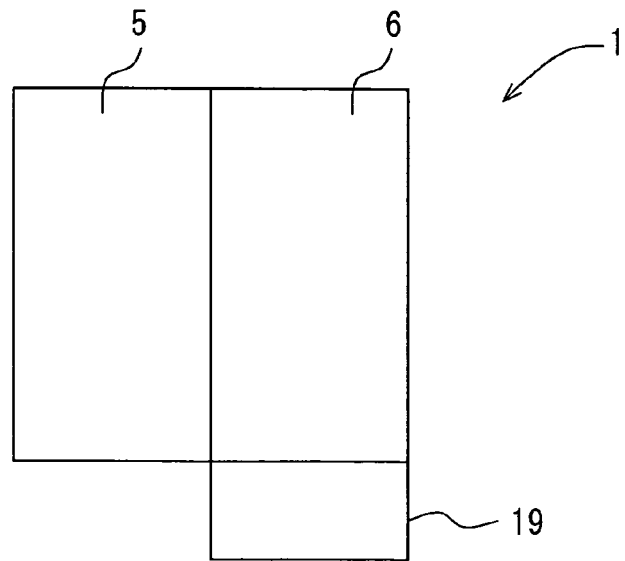
FIG. 6 is a schematic view of a vehicle alternator showing a modification of the embodiments in accordance with the present invention.
Figure 7:
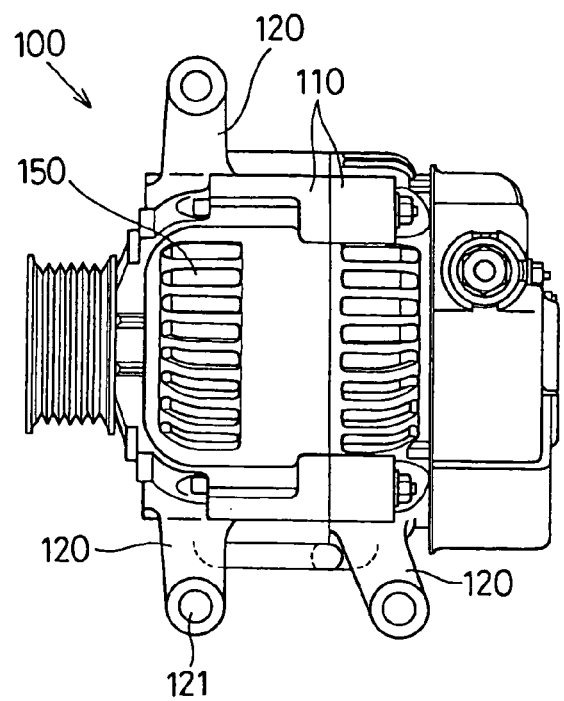
FIG. 7 is a side view of a vehicle alternator according to a prior art.
Figure 8:
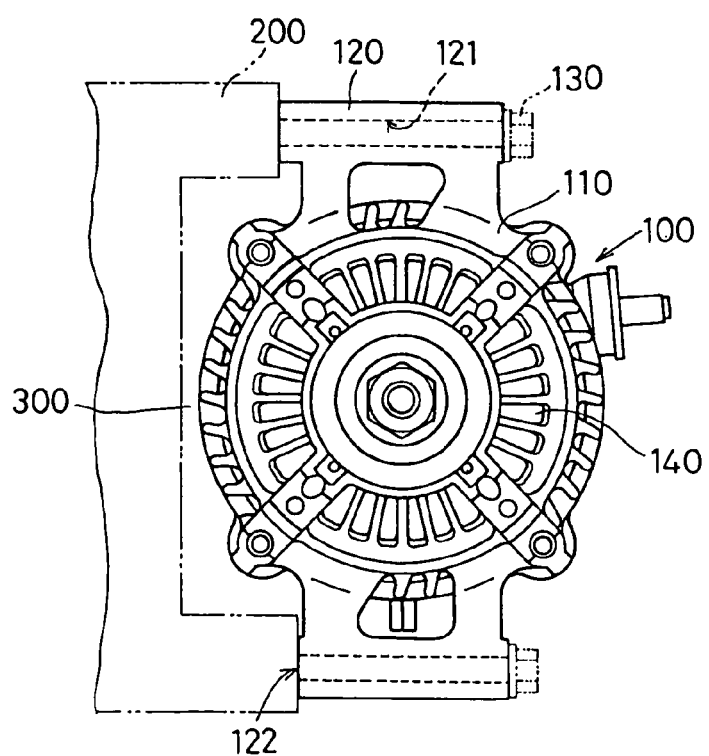
FIG. 8 is a front view of a vehicle alternator according to the prior art.

In the first and the second embodiments, the stays 19 may be integrally formed only with the rear frame 6 as shown in FIG. 6. Alternatively the stays 19 may be integrally formed with the front frame 5 and with the rear frame 6.

The present invention should not be limited to the disclosed embodiment but may be implemented in many other ways without departing from the spirit of the invention.

What is claimed is:

1. An alternator for a vehicle, comprising:
a frame supporting a rotating shaft rotatably and having at least one window for ventilation on an outer peripheral surface of its radial end; and
a plurality of stays integrally formed with the frame to fix the alternator to a mounting face of an engine side with fastening members, wherein:
the stays have mounting holes, and the mounting holes penetrate through the stays such that a penetrating axis of the mounting hole is orthogonal to the rotating shaft,
at least one of the stays has a mounting face, which contacts the mounting face on the engine side and is on the outside from an outermost surface of the frame with respect to a mounting direction in which the alternator is mounted on an engine; and
the stays comprise a first stay and a second stay, a level of a mounting face of the first stay being different from a level of a mounting face of the second stay with respect to the mounting direction, and the mounting faces of the first stay and the second stay being arranged such that a fictive line running through a center of the mounting hole on the mounting face of the first stay and a center of the mounting hole on the mounting face of the second stay is on the outside of an outermost face of the frame.

2. An alternator according to claim 1, wherein levels of the mounting faces of the stays are the same with respect to the mounting direction in which the alternator is mounted on the engine.

3. An alternator according to claim 1, wherein:
the stays have at least three mounting holes in total;
the three mounting holes are arranged such that when a center of a rotor accommodated in the frame is projected with respect to the mounting direction onto a fictive plane including a fictive polygon defined by connecting centers of the mounting holes of the stays; and
the projected center of the rotor is on the inside of the fictive polygon.

4. An alternator according to claim 1, wherein:
the stays comprises a larger stay and a smaller stay, and a mounting face of the larger stay has larger contact area than the second stay that contacts to the mounting face of the engine side; and
the larger stay has two mounting holes and the smaller stay has one mounting hole.

5. An alternator according to claim 1, wherein:
the frame comprises a front frame which is disposed on a pulley side with respect to axial direction of the rotor and a rear frame which is disposed on an opposite side of the pulley side with respect to the axial direction; and
the plurality of stays are integrally formed with only the front frame.

6. An alternator according to claim 1, wherein:
the frame comprises a front frame which is disposed on a pulley side with respect to axial direction of the rotor and a rear frame which is disposed on an opposite side of the pulley side with respect to the axial direction; and
the plurality of stays is integrally formed with only the rear frame.

7. An alternator according to claim 1, wherein:
the stays extend from both sides of the frame opposite to each other in a radial direction of the frame;
the mounting holes are provided radially outside the frame; and
the frame is provided away from the mounting face.

8. An alternator for a vehicle, comprising:
a frame supporting a rotating shaft rotatably and having at least one window for ventilation on an outer peripheral surface of its radial end; and
a plurality of stays integrally formed with the frame to fix the alternator to a mounting face of an engine side with fastening members, wherein:
the stays have mounting holes, and the mounting holes penetrate through the stays such that a penetrating axis of the mounting hole is orthogonal to the rotating shaft;
at least one of the stays has a mounting face, which contacts the mounting face on the engine side and is on the outside from an outermost surface of the frame with respect to a mounting direction in which the alternator is mounted on an engine;
the stays comprises a larger stay and a smaller stay, and a mounting face of the larger stay has larger contact area than the second stay that contacts to the mounting face of the engine side; and
the larger stay has two mounting holes and the smaller stay has one mounting hole.

9. An alternator according to claim 8, wherein levels of the mounting faces of the stays are the same with respect to the mounting direction in which the alternator is mounted on the engine.

10. An alternator according to claim 8, wherein:
the stays have at least three mounting holes in total;
the three mounting holes are arranged such that when a center of a rotor accommodated in the frame is projected with respect to the mounting direction onto a fictive plane including a fictive polygon defined by connecting centers of the mounting holes of the stays; and
the projected center of the rotor is on the inside of the fictive polygon.

11. An alternator according to claim 8, wherein:
the frame comprises a front frame which is disposed on a pulley side with respect to axial direction of the rotor and a rear frame which is disposed on an opposite side of the pulley side with respect to the axial direction; and
the plurality of stays are integrally formed with only the front frame.

12. An alternator according to claim 8, wherein:
the frame comprises a front frame which is disposed on a pulley side with respect to axial direction of the rotor and a rear frame which is disposed on an opposite side of the pulley side with respect to the axial direction; and
the plurality of stays is integrally formed with only the rear frame.

13. An alternator according to claim 8, wherein:
the stays extend from both sides of the frame opposite to each other in a radial direction of the frame;
the mounting holes are provided radially outside the frame; and
the frame is provided away from the mounting face.

14. An alternator for a vehicle, comprising:
a frame supporting a rotating shaft rotatably and having at least one window for ventilation on an outer peripheral surface of its radial end; and
a plurality of stays integrally formed with the frame to fix the alternator to a mounting face of an engine side with fastening members, wherein:
the stays have mounting holes, and the mounting holes penetrate through the stays such that a penetrating axis of the mounting hole is orthogonal to the rotating shaft;
at least one of the stays has a mounting face, which contacts the mounting face on the engine side and is on the outside from an outermost surface of the frame with respect to a mounting direction in which the alternator is mounted on an engine, wherein:
the frame comprises a front frame which is disposed on a pulley side with respect to axial direction of the rotor and a rear frame which is disposed on an opposite side of the pulley side with respect to the axial direction; and
the plurality of stays is integrally formed with only the rear frame.

15. An alternator according to claim 14, wherein levels of the mounting faces of the stays are the same with respect to the mounting direction in which the alternator is mounted on the engine.

16. An alternator according to claim 14, wherein:
the stays have at least three mounting holes in total;
the three mounting holes are arranged such that when a center of a rotor accommodated in the frame is projected with respect to the mounting direction onto a fictive plane including a fictive polygon defined by connecting centers of the mounting holes of the stays; and
the projected center of the rotor is on the inside of the fictive polygon.

17. An alternator according to claim 14, wherein:
the frame comprises a front frame which is disposed on a pulley side with respect to axial direction of the rotor and a rear frame which is disposed on an opposite side of the pulley side with respect to the axial direction; and
the plurality of stays are integrally formed with only the front frame.

18. An alternator according to claim 14, wherein:
the stays extend from both sides of the frame opposite to each other in a radial direction of the frame;
the mounting holes are provided radially outside the frame; and
the frame is provided away from the mounting face.

* * * * *